Patented July 2, 1940

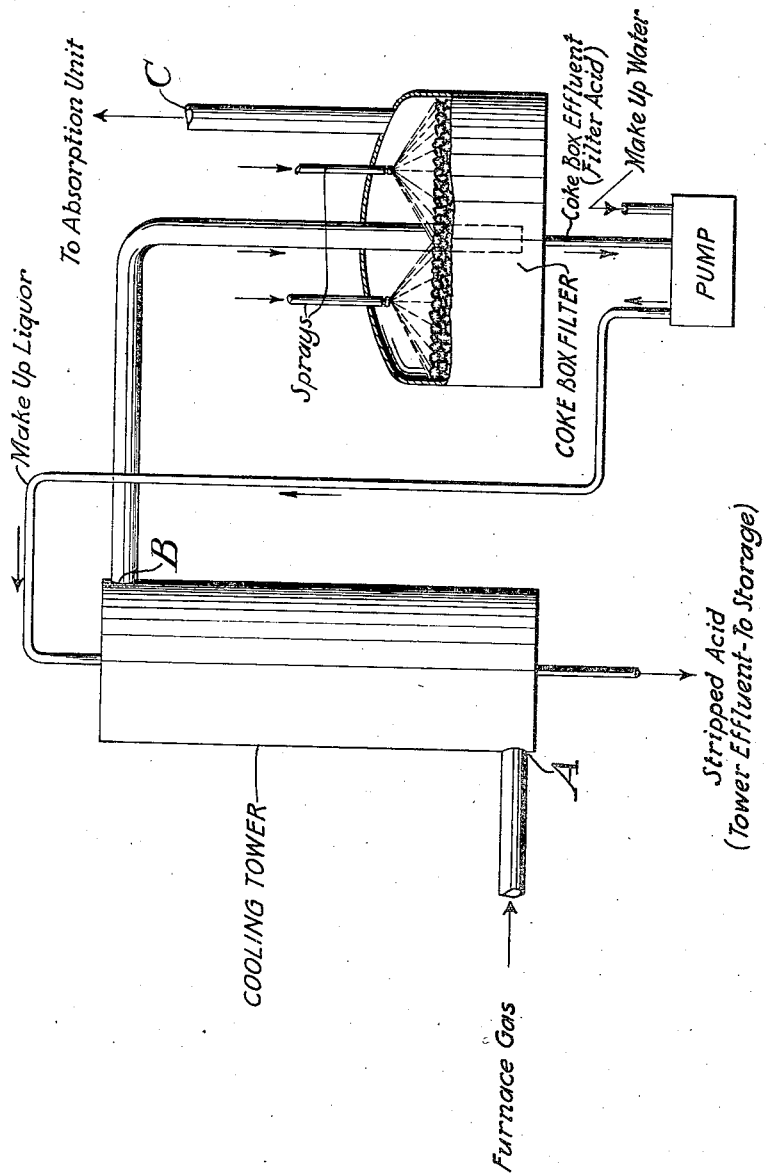

2,206,528

UNITED STATES PATENT OFFICE

2,206,528

MANUFACTURE OF HYDROCHLORIC ACID

Alvin A. Corey, Wilmington, Del., and Hallock C. Hosford, East Chicago, Ind., assignors to E. I. du Pont de Nemours & Company, Wilmington, Del., a corporation of Delaware Application September 10, 1938, Serial No. 229,272

4 Claims. (Cl. 23—154)

This invention relates to the manufacture of hydrochloric acid in systems requiring the removal of sulfuric acid mist by means of a coke-box filter, and has for its object the provision of processes designed to reduce the amount of sulfur dioxide passing thru the coke-box filter, which object is accomplished generally by maintaining the acid formed in the coke-box filter unsaturated, that is, out of equilibrium with the gas stream passing thru the coke-box filter, and more particularly by introducing water into the coke-box filter in a manner such that the acid formed therein is continuously diluted.

In the manufacture of hydrochloric acid by the Le Blanc or sulfuric acid process objectionable quantities of sulphur trioxide are introduced into the gas stream. Cooling the gas stream to condense out sulfuric acid does not adequately remove the sulfur trioxide and considerable quantities remain in the gas stream in the form of sulfuric acid mist, which may be removed by suitable high-speed scrubbing devices such as the conventional coke-box filter.

It has been observed that with the high temperatures involved in the double decomposition of sulfuric acid and a metallic chloride coupled with the presence of arsenic and organic matter as impurities and similar reducing agents, considerable quantities of sulfur dioxide are also introduced into the gas stream. The usual high-speed scrubbing devices employed for the removal of sulfuric acid mist are ineffective in removing the sulfur dioxide so that the gas passing on to the absorption unit remains contaminated therewith. It has been our observation that when gas is so contaminated sulfur dioxide is absorbed along with the hydrochloric acid and becomes oxidized to sulfur trioxide. We have found, for example, that in many cases the sulfur dioxide passing thru the coke-box filter accounts for as much as two-thirds or more of the sulfuric acid content of the absorber acid.

It is an object of our invention to reduce the amount of sulfur dioxide passing thru the coke-box filter and we have found that this can be done effectively by maintaining the acid formed therein in an unsaturated state. We have found, for example, that by introducing water into the coke-box filter in a manner such that the acid formed therein is continuously diluted the amount of sulfur dioxide passing thru the coke-box filter is substantially reduced.

In the ordinary operation of a coke-box filter the acid accumulating therein is an equilibrium acid consisting essentially of the system

We have found that an equilibrium acid of this sort is unfavorable to the oxidation of sulfur dioxide to sulfur trioxide. Our observations indicated, for example, that approximately fifty percent or more of the sulphur dioxide in the gas stream entering the coke-box filter passes on into the absorbers and is responsible for approximately two-thirds or more of the sulfuric acid content of the finished acid. The inability of the coke-box filter effectively to remove sulfur dioxide appears due to the fact that the acid formed therein, being an equilibrium acid saturated with sulfur trioxide and hydrogen chloride both of which have a greater affinity for water than sulfur dioxide, does not readily absorb sulfur dioxide without which oxidation of sulfur dioxide to sulfur trioxide does not readily take place. By maintaining the acid accumulating in the coke-box filter in an unsaturated state we increase the capacity of the acid to absorb sulfur dioxide and thereby create a condition more favorable to the oxidation of sulfur dioxide to sulfur trioxide.

While an equilibrium acid of the system

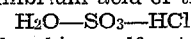

is capable of absorbing sulfur trioxide and may therefore in one sense be considered as unsaturated with respect to sulfur trioxide, nevertheless, absorption or an increase in the sulfur trioxide content cannot take place without evolution of HCl or without a change in the conditions of temperature and pressure obtaining. It will be understood, therefore, that for the purpose of this invention an equilibrium acid is to be considered "saturated," that is, saturated with respect to SO₃ and also with respect to HCl, and that the acid formed in the coke-box filter is "unsaturated" when a condition of equilibrium has not been reached for the particular condition of temperature and pressure obtaining in the coke-box filter.

A preferred form of our invention is illustrated in the accompanying flow sheet. Furnace gas obtained by the double decomposition of sulfuric acid and sodium chloride is passed thru a cooling tower and thence thru a coke-box filter. In passing thru the cooling tower the furnace gas is cooled largely by evaporation of water from the make-up liquor to a temperature such that any sulfur trioxide remaining therein exists in the form of sulfuric acid mist. The sulfuric acid mist so formed is then removed as the gas passes on thru the coke-box filter. The coke-box effluent or filter acid is suitably diluted with water or dilute acid and fed to the cooling tower at a rate sufficient to effect the desired degree of cooling. In the passage of this acid thru the cooling tower its hydrogen chloride content is stripped therefrom by the action of the hot furnace gas and reintroduced into the system.

The coke-box filter is provided with spray nozzles adapted to spray water or dilute acid over the surface of the coke. This water trickles down thru the coke in countercurrent flow to the gas and by dilution of the acid formed in the coke-box filter operates to maintain the acid formed therein in a state of unsaturation.

The amount of water introduced by the spray nozzles is not critical since introduction of water at this point serves to supply at least in part the water necessary to effect cooling of the furnace gas in the cooling tower. In fact all the water necessary for cooling may be added at this point provided loading of the coke is avoided, that is, so long as the interstices of the coke filter are not so filled with water as to prevent passage of the gas therethru. Large amounts of water may be introduced at this point without deleteriously affecting the operation of the coke-box filter. Moreover, the increased absorption of hydrochloric acid in the coke-box filter due to addition of water at this point is not objectionable, since whatever amount of hydrochloric acid is removed from the system by way of the coke-box effluent or filter acid is again reintroduced into the system in the cooling tower. We do not intend to imply that such large amounts of water are necessary in operating the coke-box filter according to our invention, since even relatively small quantities of water introduced in this manner will effect a substantial reduction of the amount of sulfur dioxide passing thru the filter.

It is an important feature of our invention that the scrubbing of the gas in the coke-box filter is effected by means of an acid formed in part, at least, by condensation and absorption of impurities in the gas stream, because the acid so formed contains substances which promote the oxidation of sulfite to sulfate. For example, the liquor so formed contains ferric iron and frequently also free chlorine which act to promote oxidation of sulfite to sulfate. Consequently, even tho the coke-box filter is classified as a high-speed scrubbing device, nevertheless, the oxidation of sulfite to sulfate proceeds at a sufficiently rapid rate that effective removal of sulfur dioxide from the gas stream is obtained.

The effectiveness of our invention in reducing the amount of sulfuric acid in the finished acid can be demonstrated by comparing the amounts of sulfur compounds passing thru the filter when operated with and without the water spray. In such case, however, sufficient time should be allowed for each type of operation to attain its characteristic condition of equilibrium. For example, the effect of the water spray persists for a considerable time after the spray is cut off, the amount of sulfur dioxide passing thru the filter gradually increasing over a period of several days.

In a typical operation without the water spray it was found that approximately one-half the sulfur dioxide content of the gas entering the coke-box filter was removed. Notwithstanding, the sulfur dioxide passing thru the coke-box filter accounted for approximately two-thirds of the sulfuric acid in the finished product (20° Baumé hydrochloric acid). This acid contained 0.39 per cent sulfuric acid of which 0.26 per cent was due to the sulfur dioxide and 0.13 per cent to the sulfuric acid mist passing thru the coke-box filter. It is evident therefore that if all the sulfur dioxide could be removed from the gas stream in the coke-box filter the sulfuric acid content of the finished acid would not exceed about 0.13 per cent. How near the processes of our invention approach this result is evidenced by the fact that when the coke-box filter was operated with water sprays the sulfuric acid content of the finished acid dropped from 0.39 per cent to 0.17 per cent. This amounts to a 56 per cent reduction in the sulfuric acid content of the finished acid.

While we have illustrated our invention with reference to the preferred embodiment illustrated in the flow sheet, numerous variations may be made without departing from the spirit of the invention as long as the acid formed in the coke-box filter is maintained in an unsaturated state. Thus variation may be made in the nature of the coke-box filter, in the manner in which the water is introduced and the nature of the system in which the coke-box filter is employed. Any filter suitable for scrubbing out sulfuric acid mist may be employed, and when we refer to "coke-box filter" it is to be understood that we have reference to a general type and intend that the term shall include any equivalent filter, irrespective of whether the filter medium be coke or some other material suitable for scrubbing out sulfuric acid mist.

It is not essential to our invention that the coke-box effluent or filter acid be passed over the cooling tower, as any suitable disposition of this acid may be made. The processes of our invention, however, are particularly advantageous in the type of system illustrated since the water introduced into the coke-box filter serves a twofold function, namely, to dilute the acid formed therein to prevent saturation, and, secondly, to supply at least in part the water necessary to effect cooling of the furnace gas in the cooling tower. Moreover, in the particular system illustrated no close control over the amount of water introduced in the coke-box filter is required to prevent undue absorption of hydrochloric acid therein, since as already pointed out the hydrochloric acid content of the filter acid is reintroduced into the system as this acid passes thru the cooling tower.

The amount of water to be introduced into the coke-box filter may be varied widely, depending upon the type of installation, and those skilled in the art will obviously be able to adjust the amount of water as required to meet the conditions obtaining in any particular plant. If the hydrochloric acid content of the filter acid is not recovered in the cooling tower as illustrated, it is desirable, however, to employ a minimum amount of water. Otherwise, as already pointed out, any amount which does not load the coke-box filter will be found suitable. While we have referred to the introduction of water into the coke-box filter it will be apparent that dilute acid or other aqueous liquors may be used instead. Substances adapted to promote the oxidation of sulfite to sulfate may also be included if desired, altho, as already pointed out, such substances are inherently present in the acid formed in the coke-box filter.

As many apparently widely different embodiments of our invention may be made without departing from the spirit and scope thereof, it is to be understood that we do not limit ourselves to any of the specific embodiments or variations thereof which have been described above, but that various devices and expedients may be employed in maintaining the acid formed in the coke-box filter in a state of unsaturation and such devices and expedients are to be considered as coming within the spirit and scope of our invention.

We claim:

1. In the manufacture of hydrochloric acid the method of removing sulfur dioxide and sulfuric acid mist from the gas stream which comprises passing the gas thru a filter adapted to scrub out the sulfuric acid mist and introducing water into the filter as required to prevent the acid formed therein from becoming saturated.

2. In the manufacture of hydrochloric acid the method of removing sulfur dioxide and sulfuric acid mist from the gas stream which comprises passing the gas upwardly thru a filter adapted to scrub out the sulfuric acid mist and passing a stream of water downwardly thru the filter whereby the acid formed therein is continuously diluted.

3. In the manufacture of hydrochloric acid the method of removing sulfur dioxide and sulfuric acid mist from the gas stream which comprises passing the gas thru a filter adapted to scrub out the sulfuric acid mist and spraying water in the filter countercurrent to the flow of gas therein.

4. The process for removing sulfur dioxide from hydrochloric acid-containing gas contaminated with sulfur compounds which comprises scrubbing the gas in the presence of a substance adapted to promote the oxidation of sulfite to sulfate with an aqueous medium consisting essentially of the system $H_2O$—$SO_3$—$HCl$ and introducing water into said medium as required to prevent establishment of a condition of equilibrium.

ALVIN A. COREY.
HALLOCK C. HOSFORD.